(12) United States Patent
Lopez (10) Patent No.: US 6,186,898 B1
(45) Date of Patent: Feb. 13, 2001

(54) ELASTIC COUPLING DEVICE BETWEEN TWO SUBSTANTIALLY ALIGNED SHAFTS

(75) Inventor: Carlos Lopez, Creteil (FR)

(73) Assignee: Valeo (FR)

(*) Notice: Under 35 U.S.C. 154(b), the term of this patent shall be extended for 0 days.

(21) Appl. No.: 09/194,928

(22) PCT Filed: Apr. 10, 1998

(86) PCT No.: PCT/FR98/00733

§ 371 Date: Dec. 4, 1998

§ 102(e) Date: Dec. 4, 1998

(87) PCT Pub. No.: WO98/45616

PCT Pub. Date: Oct. 15, 1998

(30) Foreign Application Priority Data

Apr. 10, 1997 (FR) .................................................. 97 04649
Jun. 25, 1997 (FR) .................................................. 97 08251

(51) Int. Cl.$^7$ ........................................................ F16D 3/12
(52) U.S. Cl. ............................ 464/68; 192/70.17; 464/98
(58) Field of Search .................................. 464/68, 98, 24, 464/101, 162, 99; 192/70.17, 208, 70.13

(56) References Cited

U.S. PATENT DOCUMENTS

| 2,787,896 | | 4/1957 | Jumisco . | |
|---|---|---|---|---|
| 4,828,533 | * | 5/1989 | Focqueur et al. ....................... | 464/24 |
| 4,908,003 | * | 3/1990 | Kobayashi et al. ..................... | 464/68 |
| 4,928,486 | * | 5/1990 | Despres ................................... | 464/68 |
| 5,194,044 | * | 3/1993 | Jackel et al. ............................ | 464/24 |
| 5,253,740 | * | 10/1993 | Kohn et al. ........................ | 192/70.16 |
| 5,551,318 | * | 9/1996 | Fukushima ........................... | 464/101 |
| 5,617,940 | * | 4/1997 | Fukushima et al. .............. | 192/70.17 |
| 5,778,738 | * | 7/1998 | Takabayashi et al. ................. | 74/574 |

* cited by examiner

Primary Examiner—Anthony Knight
Assistant Examiner—Kenneth Thompson
(74) Attorney, Agent, or Firm—Liniak, Berenato, Longacre & White (57) ABSTRACT

The invention concerns an elastic coupling device comprising a first guide washer (1) integral in rotation with the drive washer and a disc (10) integral with a hub (17) oriented towards the first guide washer (1), which bears at its outer periphery a second guide washer. The invention is applicable to motor vehicles.

17 Claims, 5 Drawing Sheets

ELASTIC COUPLING DEVICE BETWEEN TWO SUBSTANTIALLY ALIGNED SHAFTS

BACKGROUND OF THE INVENTION

1. Field of the Invention

The present invention concerns an elastic coupling device between two aligned or substantially aligned shafts, respectively a driving shaft and a driven shaft, said device including circumferential action spring damper means mechanically disposed between the two shafts.

2. Description of Related Art

A device of the above kind is described in document FR-A-2 385 940, for example. In that document the coupling device is mounted between the crankshaft of the engine of a motor vehicle and the input shaft of a transmission, referred to as the transmission shaft.

The device includes a solid hub with internal splines force-fitted onto the transmission shaft and an external annular flange connected to the crankshaft by a drive plate. The hub extends axially in the opposite direction to the crankshaft.

Two guide washers on respective opposite sides of the flange are fixed to the hub. Springs mounted in facing housings in the guide washers and the flange elastically couple the flange to the guide washers.

The above solution is not entirely satisfactory because of its relatively large overall size in the axial direction. Also, it uses a large number of components. In document U.S. Pat. No. 2,787,896 the elastic coupling device has a greater overall axial size at its inside periphery. The axial overall size is large because the guide washers are fixed externally to an axially oriented annular rim on a plate.

SUMMARY OF THE INVENTION

An aim of the present invention is to provide a simple and economic way to overcome the above drawbacks.

In accordance with the invention an elastic coupling device of the above kind is characterised in that the drive plate is constrained to rotate with one of the guide washers, referred to as the first guide washer, while the flange is fastened, possibly after taking up circumferential play, to the hub, in that the hub is directed axially towards the first guide washer, in that the first guide washer carries the other guide washer, referred to as the second guide washer, fixed to its outside periphery, and in that said device is thicker at its outside periphery than at its inside periphery.

The invention considerably reduces the axial overall size of the device. Also the flange has a reduced radial overall size and is therefore more economical.

A starter ring gear and an inertia weight can therefore be installed radially beyond the flange to increase the inertia for the same radial overall size.

The first washer then carries rivets for fixing the second guide washer passing axially through said ring gear and said weight.

The starter ring gear and the inertia weight therefore form a spacer between the guide washers.

In an alternative embodiment the guide washers are in contact with the outside periphery and the rivets pass through the starter ring gear, the contacting parts of the guide washers and the inertia weight so that the guide washers are gripped between the inertia weight and the starter ring gear.

The rivets can of course be replaced by nut and bolt fixings or any other assembly means. In an alternative embodiment the guide washers are identical at their outside periphery and are joined face to face by virtue of being fastened together by a weld bead. One of the washers carries the inertia weight and the other carries the starter ring gear.

By virtue of the invention the elastic coupling device provides additional functions, in particular starting functions, in a simple and economic manner.

The device can have the weight required for good filtration of vibration.

In one embodiment the second guide washer is shorter in the radial direction than the first guide washer. To be more precise, the central opening of the second guide washer has a diameter greater than that of the first guide washer.

Because of this the axial overall size of the elastic coupling device can be further reduced as the flange can have a tortuous shape with a first internal portion at the level of the second guide washer offset axially relative to a main second portion between the two guide washers.

In one embodiment the first guide washer is in one piece with the drive plate, which economises one component.

The first guide washer can be fixed using fixing screws the heads of which are disposed axially between the first guide washer and the flange. The flange then has holes for access to the screw heads for turning them by means of a tool such as a screwdriver.

In a second embodiment the first guide washer surrounds the drive plate and is connected to it by elastic tongues in the axial direction.

Axial vibrations from the crankshaft of the engine of the vehicle, which is subject to axial oscillations, can therefore be damped (filtered).

Clearly the drive plate is then reduced to a simple washer and the first guide washer is rotationally connected to the drive plate but able to move axially relatively to it because of the tangential tongues.

Such damping can equally be obtained by making the first guide washer flexible, for example by providing holes in it.

In one embodiment the hub is in one piece with the flange of meshing means with circumferential play between the hub and the flange. In an alternative embodiment the hub is separate from the flange. The free end of the hub can be chamfered to enter the interior of the driving shaft.

Clearly, by virtue of the invention the elastic coupling device forms a unitary module of small axial overall size that can be tested and balanced dynamically in advance, before it is fixed to the driving shaft.

To this end the first guide washer has at its inside periphery first fixing means for fixing it directly or indirectly to the driving shaft and, radially beyond said first fixing means, second fixing means for fixing the second guide washer.

BRIEF DESCRIPTION OF THE DRAWINGS

The following description illustrates the invention with reference to the accompanying drawings in which.

DETAILED DESCRIPTION OF THE PREFERRED EMBODIMENTS

Figure 1:
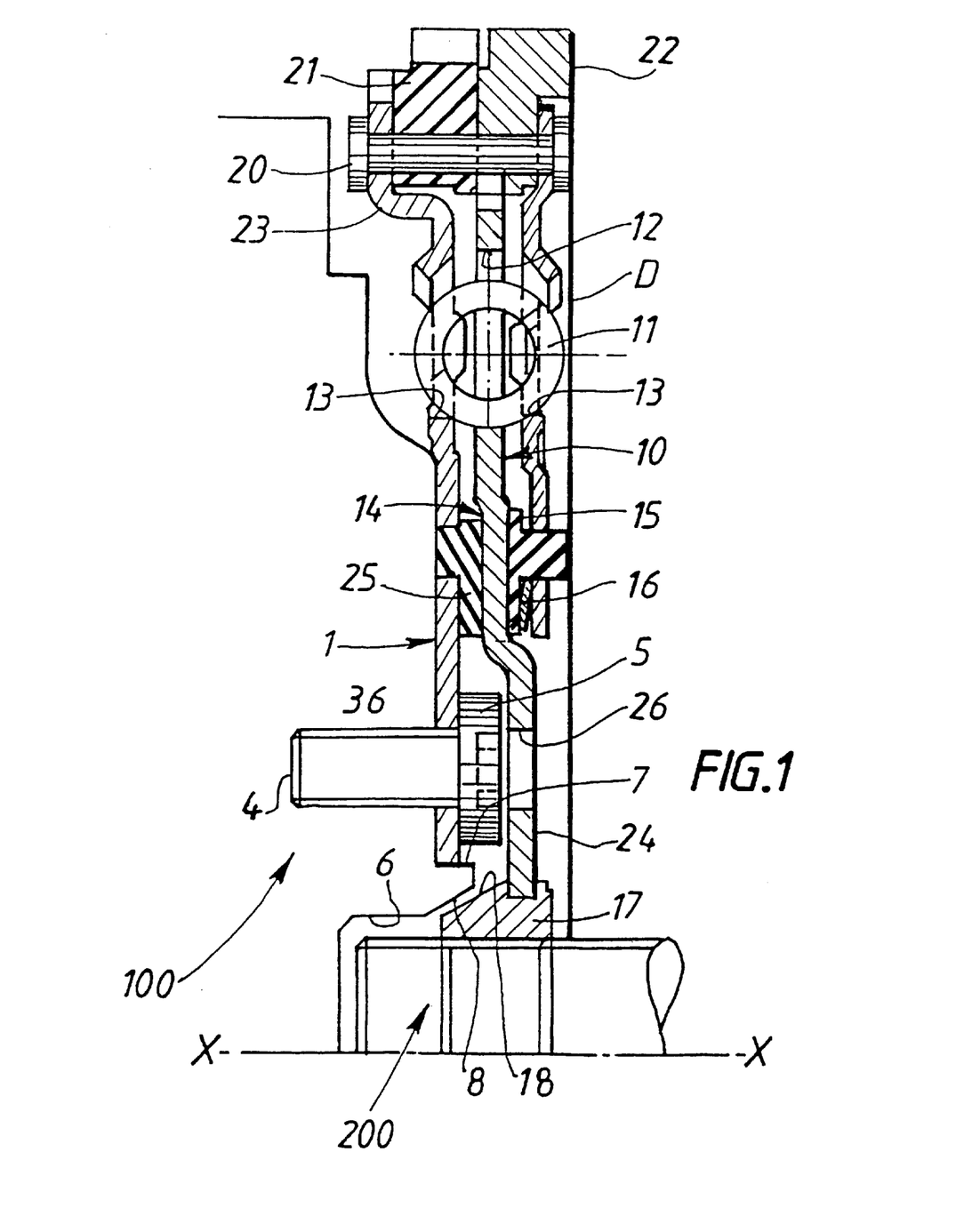
FIG. 1 is a half-view in axial section of the elastic coupling device in accordance with the invention.

The device is adapted to couple two substantially aligned shafts 100, 200, namely a driving shaft 100 and a driven shaft 200 (FIG. 1).

In the case of a motor vehicle application, the driving shaft 100 is the crankshaft of the internal combustion engine of the vehicle and the driven shaft 200 is the input shaft of a variable pulley type transmission (not shown). The device includes a drive plate 1 with its inside periphery fixed to the end of the crankshaft by fixing screws 4 the heads 5 of which each have an imprint (no reference number) for a tool for turning them.

The crankshaft 100 has an axially oriented cylindrical centering bearing surface 7 adapted to come into intimate contact with the inside periphery of the plate 1. The crankshaft is hollow in the centre and has a chamfer 8 at its free end.

The elastic and rotational coupling device further includes two guide washer 1,9 (FIGS. 1 through 3, 8 and 9)—1,3 (FIG. 4 and 5)—2,9 (FIGS. 6 and 7) disposed on respective opposite sides of a flange 10, the guide washer 1—2 constituting a first guide washer and the guide washer 3—9 constituting a second guide washer.

Circumferential action spring means 11 (FIGS. 1 through 3, 6, 7, 8, and 9)—110 (FIGS. 4 and 5) are housed in housings 12, 13 (FIGS. 1 through 3, 6, 7, 8 and 9)—120, 130 (FIGS. 4 and 5) facing each other in the flange 10 and in the guide washers 1,9—1,3—2,9, respectively. The spring means 11, 110 are therefore operative between the flange 10 and the guide washers 1,9—1,3—2,9 and are mechanically disposed between said guide washers and the flange.

The spring means can comprise a stack of Belleville springs, as described in document FR-A-2 385 940, to which reference may be had for more information.

Figure 4:
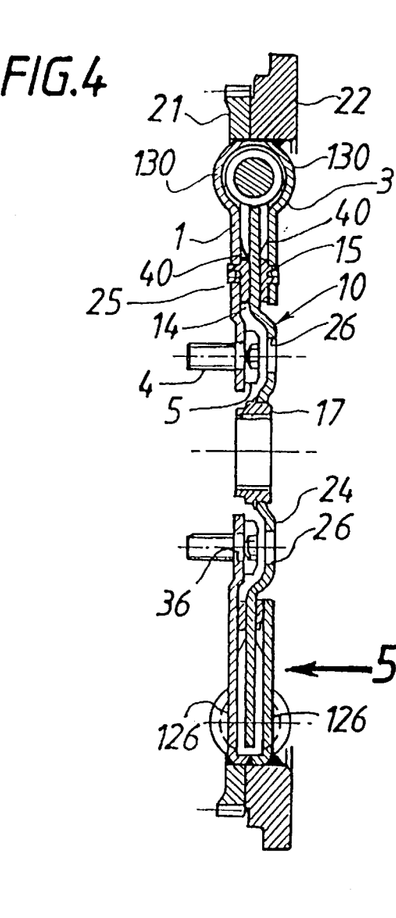
FIGS. 4 and 5 are views analogous to FIGS. 2 and 3 for a third embodiment, the lefthand part of FIG. 5 being a sectional view without the inertia weight and the starter ring gear being shown in dashed outline.
Figure 5:
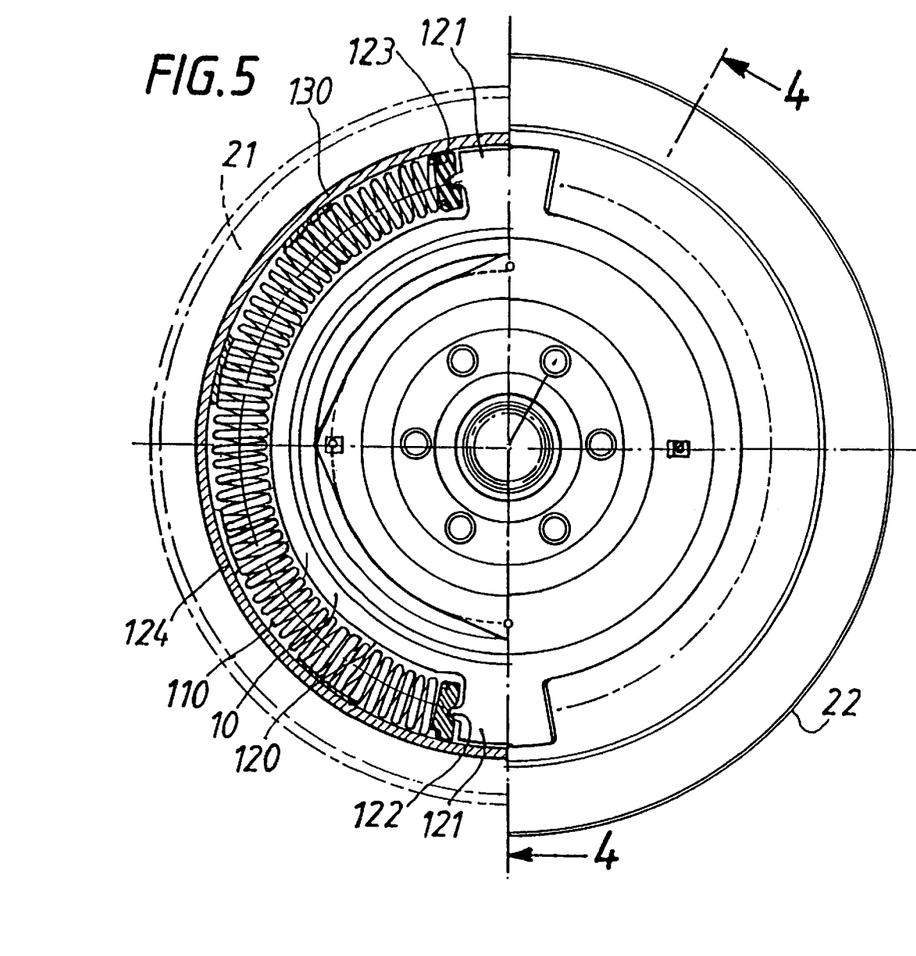

The spring means 11, 110 shown here are coil springs. In FIGS. 1 through 3, 6 and 7 the springs 11 are short coil springs. In FIGS. 4 and 5 they are long curved springs 110 which can be pre-curved. In an alternative embodiment the spring means are elastomer blocks.

The spring means 11, 110 shown here are all housed without play in the housings 13, 130 in the guide washers.

The spring means 11, 100 can all be housed without play in the housings 12, 120 in the flange 10.

In FIGS. 1 through 3, 6, 7, 8 and 9 and in a manner that is known in itself some of the spring means 11 are housed without play in the housings 12 in the flange 10 and others are housed with circumferential play in the housings 12, for staggered intervention of said spring means for improved filtering of vibrations.

In these figures there are eight regularly distributed springs 11 and the housings 12, 13 are facing windows as described in document FRA-A-2 494 795, to which reference may equally be had for more information. As seen better in FIGS. 3, 7 and 9, some windows 12 in the flange 10 have a greater circumferential length than the windows 13 in the facing guide washers 1,9—2,9. All the springs 11 are mounted without play in the windows 13. Axial action friction means 14 operate between the guide washers 1,9—1,3—2,9 and the flange 10.

The friction means 14 are radially below the circumferential action spring means 11, 110 and are carried by the guide washers 1,9—1,3—2,9. The friction means 14 are radially above the fixing members 4.

To be more precise, and as described in the above-mentioned document FR-A-2 494 795, the friction means shown here comprise a first application washer 15 constrained to rotate with the second guide washer 9 and rubbing against the flange 10 (on the face thereof facing towards the second guide washer 3,9). A pre-stressed axial action spring washer 16, shown here as a Belleville washer but in an alternative embodiment a corrugated washer, is inserted between the second guide washer 3,9 and the first application washer 15. The application washer 15 has projections, shown here as cylindrical pins (no reference number), inserted in holes (no reference number) in the second guide washer for rotationally coupling the first application washer 15 to the second guide washer 3,9 with axial mobility.

The first application washer shown here is made of plastics material and rubs directly against the flange 10. It is charged with glass fibres, for example.

A second friction washer 25 which here is exactly the same shape as the first application washer 15 faces the first application washer 15 on the opposite side of the flange 10.

The washer 25 is inserted between the first guide washer 1-2 and the flange 10. The washer 25 rubs against the flange 10 (on the side facing towards the first guide washer) and is rotationally coupled to the first guide washer by cylindrical pins on it inserted in holes in the first guide washer. The spring washer 16 bears on the second guide washer to urge the first application washer 15 towards the flange 10 so that the reaction force presses the second friction washer 25 against the first guide washer 1, which is connected to the second guide washer as described below, to generate friction through contact with the flange 10.

The windows 13 in the guide washers are delimited by lips for retaining the springs.

In an alternative embodiment the housings consist of pressed portions 130 in the guide washers 1,3 and notches 120 opening radially outwards in the flange 10 (see FIGS. 4 and 5). The notches 120 are delimited by radial lugs 121 with circumferential fingers 122 engaging in a recess in a bearing cup 123 against which the curved springs 110 bear. Shoes 124 are each clipped onto one turn of the spring 110 and are disposed between the outside periphery of the springs 110 and the inside periphery of the generally semi-circular pressed portions 130 in order to reduce friction, as described in document U.S. Pat. No. 2,002,115. The cups 123 are extended at their outside periphery to form a shoe retaining the end turns of the springs 110, there being two of them as shown here subtending an angle of substantially 180°.

Large ranges of relative angular movement can be obtained, as in the other figures. As shown here the guide washers 1,3 have identical outside peripheries. The washers are fastened together face to face at their free edge by welding them together, as described in document FR-A-2 411 999.

The pressed portions 130 thus form a torus at the outside periphery of the guide washers 1,3 of the same thickness.

The respective torus envelopes the major part of each spring 110. To be more precise, the pressed portions 130 are extended at their inside periphery by transverse portions of the main parts of the guide washers. Sealing washers 40 are gripped between the flange 10 and the first friction washer 15 and the second friction washer 25. The washers 40 are inclined beyond the washers 15, 25 to bear on the respective inside faces of the washers 1 and 3, facing towards the flange 10. This defines a fluid-tight cavity delimited by the pressed portions 130 and closed on the inside by the sealing washers. This cavity is filled with a paste-like or viscous agent such as grease in order to lubricate the springs 110, which therefore operate under good conditions without any risk of them being pressed into the pressed portions 130 by the shoes 124, which can be replaced by channels.

Facing the lugs 121 the guide washers 1,3 are of course flattened to form parallel flat plates 126 and bearing portions at the ends of the springs 110 mounted without play in the pressed portions 130, interrupted by the flat parts 126, and in the notches 120.

This exploits the friction means 14, the lugs 121 of the flange 10 entering the aforementioned cavity.

The washers 15, 25 are of course cut-out to form a centering shoulder for the sealing washer 40 concerned.

The friction means 14 can have a different shape but the friction means shown here are economical because they employ a small number of washers 15, 16, 25 and the friction and application washers 25, 15 are identical apart from their thickness.

Another result of this is that the two guide washers 1,9—1,3—2-9 have identical holes for the pins on the washers 15, 25.

The elastic coupling device generally includes a drive plate 1 for rotationally coupling said device to the driving shaft (here the crankshaft 100) and a hub 17 for rotationally coupling said device to the driven shaft (here the input shaft 200). Between the plate 1 and the hub 17 there are two coaxial parts which can move angularly relatively to each other against circumferential action spring means 11, 110 and axial action friction means 14.

One of these parts comprises the guide washers 1,9—2, 9—1,3 and the other part comprises the flange 10.

FIG. 1 shows the rotation axis X—X of the device, which is coincident with the axes of the substantially aligned shafts 100, 200, allowing for manufacturing and assembly tolerances.

On relative angular movement between the guide washers 1,9 and the flange 10 disposed between said washers, the spring means 11 are compressed and friction is generated between the flange 10 and the friction and application washers 25, 15. The same applies in the other figures.

In accordance with the invention, to reduce the axial overall size the first guide washers 1,2 are constrained to rotate with the drive plate and the flange 10 is fastened, possibly after taking up circumferential play, to the hub 17 directed axially towards the first guide washer 1 forming the drive plate.

In FIGS. 1 through 5 the first guide washer 1 is in one piece with the drive plate 1.

This reduces the number of components of the elastic coupling device.

In accordance with another feature of the invention the second guide washer 3,9, which has a simple shape, the flange 10 and the first guide washer 1 are fixed to the first guide washer 1.

The guide washers 1,9, the flange 10 and the hub 17 are metal parts. The flange 10 and the guide washers 1,9 are simple to manufacture by pressing. The same applies to the other figures.

The hub 17 can be in one piece with the flange 10, the inside periphery of which is then in the form of a sleeve splined at the front. The flange 10 shown here is crimped to the end of the hub 17.

To achieve this, and in a manner that is known in itself, the hub 17 is softer than the flange 10 and has a stepped diameter at the end opposite the first guide washer 1. The flange 10 has splines on its inside periphery and is force-fitted onto the smaller diameter portion of the hub 17 until it abuts against the shoulder formed by the change in the diameter of the hub 17. During this force-fitting operation the flange 10 cuts grooves in the hub 17.

After this operation the material at the end of the hub 17 is peened to form a second shoulder and to lock the flange 10 in the other axial direction. The flange 10 is constrained to rotate with the hub 17 by the grooves that it has cut into it and its splines engaged in said grooves.

In an alternative embodiment the flange 10 is welded to the end of the hub 17.

In FIG. 1 the other end of the hub 17 is joined to the fixing area of the flange 10 by a frustoconical portion 18 so that the axially projecting part of the hub 17 is chamfered. The hub 17 is thicker at the axial end adjacent the flange 10 than at the other axial end adjacent the crankshaft. The heads of the fixing screws 4 are radially above the hub 17.

Accordingly, the hub 17 penetrates slightly into the interior of the crankshaft 100, to be more precise into the interior of the central recess 16 in the crankshaft 100 previously mentioned as providing a receptacle for the free end of the input shaft 200, which has the benefit of reducing axial overall size. The hub 17 extends partly radially below the heads 5 of the fixing screws 4 and penetrates into the interior of the chamfer 8 on the crankshaft 100, the frustoconical portion 18 of the hub 17 being parallel to said chamfer 8.

When the flange 10 forms the hub in the aforementioned manner, said hub is thinner and as a result penetrates further into the recess 6.

Accordingly, in FIG. 1 the flange 10 is fastened to the hub 17 both rotationally and axially.

In an alternative embodiment, the flange 10 is axially fastened to the hub 17, possibly after taking up axial play, and rotationally fastened to the hub 17 after taking up circumferential play. This can also apply in the other figures. To be more precise, in an alternative embodiment, as described in document FR-A-2 496 210 (U.S. Pat. No. 4,613,029), the flange 10 has female teeth at its inside periphery and the hub has male teeth at its outside periphery. In each case the teeth alternate with notches and both are advantageously trapezoidal. The male teeth enter the notches between the female teeth with circumferential play and the female teeth enter the notches between the male teeth with circumferential play to form meshing means with circumferential play.

Facing notches are formed in the male and female teeth to accommodate low-stiffness spring members for filtering vibration when the engine of the vehicle is idling. The spring members are usually coil springs with bearing plates having a dihedral dorsal surface disposed between the circumferential ends of the springs and the notches, as shown in FIG. 3 of the previously mentioned document FR-A-2 496 210, the content of which is deemed to be incorporated into the present invention.

The male teeth are formed in an area of increased thickness so that it is possible to delimit the male teeth laterally by two washers attached, for example welded, riveted or crimped, to the hub. The washers then plug the axial ends of the notches between the male teeth and thereby constitute axial abutments for the female teeth of the flange 10 so that the flange 10 is connected axially to the hub 17.

In all cases, because of the axial locking of the flange 10 onto the hub, a module can be formed in the manner described below.

The first guide washer 1 has holes 36 at its inside periphery through which the threaded part of the screws 4 passes. After fitting it to the crankshaft 100 the first guide washer 1 is disposed and gripped between the crankshaft and the heads 5 of the fixing screws 4 which are regularly distributed in the circumferential direction.

The number of screws depends on the application. In an alternative embodiment the first guide washer 1 forming a supporting member is fixed to the crankshaft by studs or bolts, rivets or other fixing means.

Figure 6:
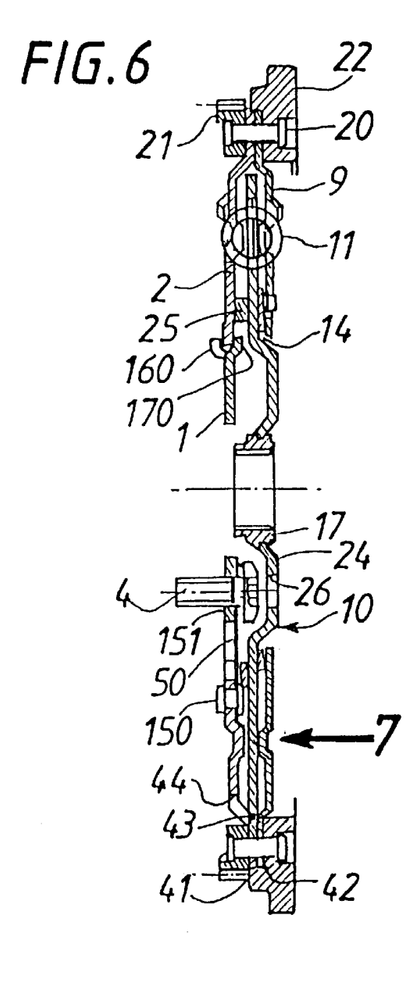
FIGS. 6 and 7 are views similar to FIGS. 2 and 3 for a fourth embodiment with two locally cut away areas in FIG. 7 to show part of the flange, the tongues and the windows.
Figure 7:
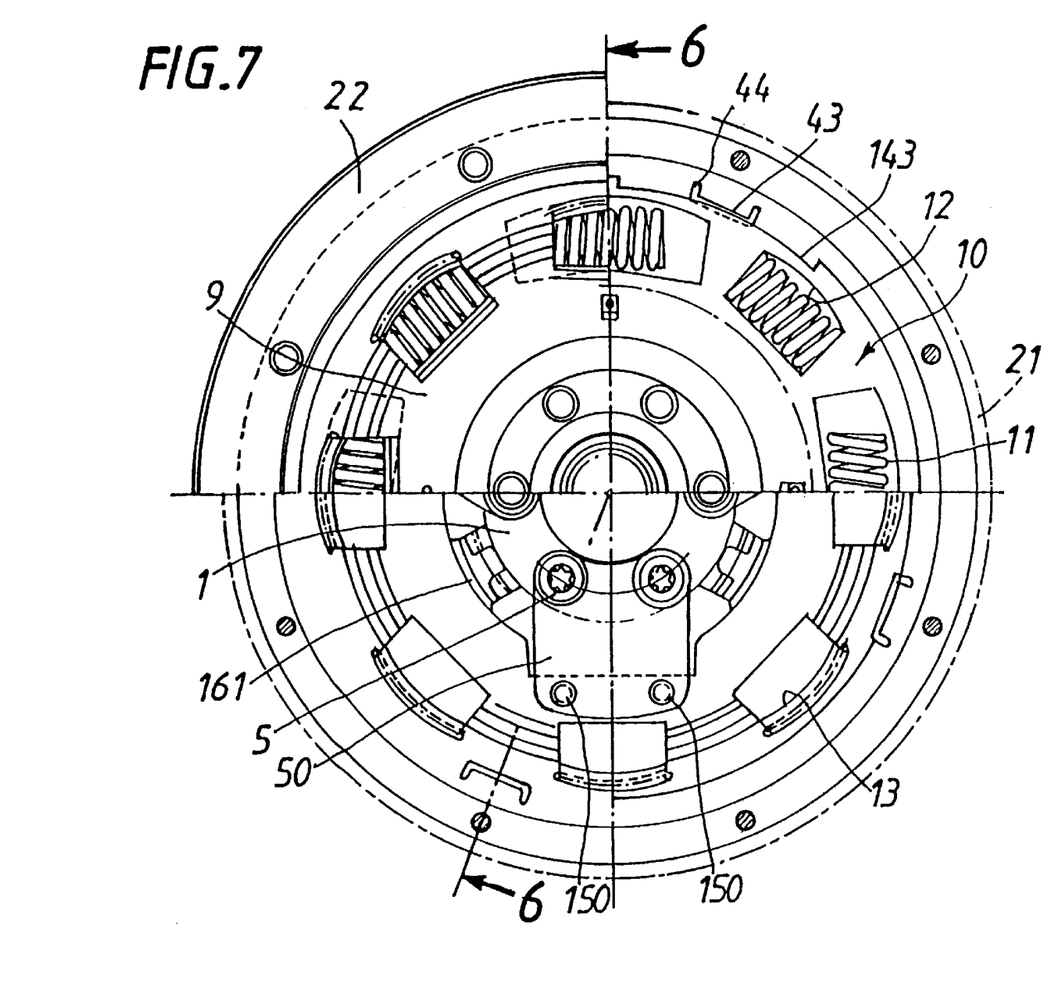

In all cases the first guide washer 1,2 has first fixing means at its inside periphery for fixing it either directly or indirectly to the driving shaft, here the holes 36 through which the screws 4 pass (see FIGS. 6 and 7).

Radially beyond said first means the first guide washer 1,2 carries and has fixed to it the second guide washer 3,9. To be more precise, the first guide washer carries the other guide washer which is fixed to its outside periphery.

To this end the two guide washers 1,9 can be connected and fixed together by means of spacers passing through the notches in the flange 10, as described in document FR-A-2 494 795. The notches alternate circumferentially with the windows 12,13.

In an alternative embodiment the notches are in the bottom edge of the windows.

In FIG. 1 the second guide washer 9 is fixed to the first guide washer 1 radially beyond the circumferential action spring means 11, at the outside periphery of the first guide washer.

This fixing is effected by rivets 20 fastening the guide washers 1,9 together.

The rivets therefore pass through axially aligned openings in the guide washers and openings in axial coincidence therewith in a starter ring gear 21 in contact with the first guide washer 1 and in an inertia weight 22 in contact with the second guide washer 9. The starter ring gear 21 and the inertia weight 22 therefore form a spacer between the two guide washers 1,9, projecting radially outwards relative to said washers 1,9.

To achieve this the first guide washer 1 has at its outside periphery a transversely oriented portion 23 offset axially outwards relative to the main part of the first guide washer 1 and thus in the opposite direction to the second guide washer 9. The starter ring gear 21 is in contact with the portion 23, the height of which depends on the ring gear 21.

The inertia weight 22 has projections on its inside periphery in the form of lugs directed radially inwards to cooperate with notches at the outside periphery of the flange 10.

The projections engage in the notches with circumferential play. Thus relative angular movement between the guide washers 1,9 and the flange 10 is limited by the projections coming into contact with the lateral edges concerned of the notches.

In an alternative embodiment such limitation is achieved by the turns of the springs 11 coming into contact.

Because of the portion 23 the starter ring gear 21 in FIG. 1 is offset axially relative to the flange 10 with the result that the inertia weight 22 can mesh with play with the flange 10. The inertia weight 22 extends radially partly over the second guide washer 9.

The weight 22 projects axially outwards relative to the second washer 9 by an amount corresponding to the thickness of the rivet head 20.

The elastic coupling device is therefore thicker at its outside periphery than at its inside periphery and has second fixing means 20, 21, 22 separate from the first fixing means to form a unitary module that can be handled and transported separately. The device has weights (the ring gear 21 and the weight 22) increasing its inertia radially beyond the spring means 11, 110.

The inertia weight 22 is softer than the starter ring gear 21 and there is therefore no need to harden the flange 10.

Figure 2:
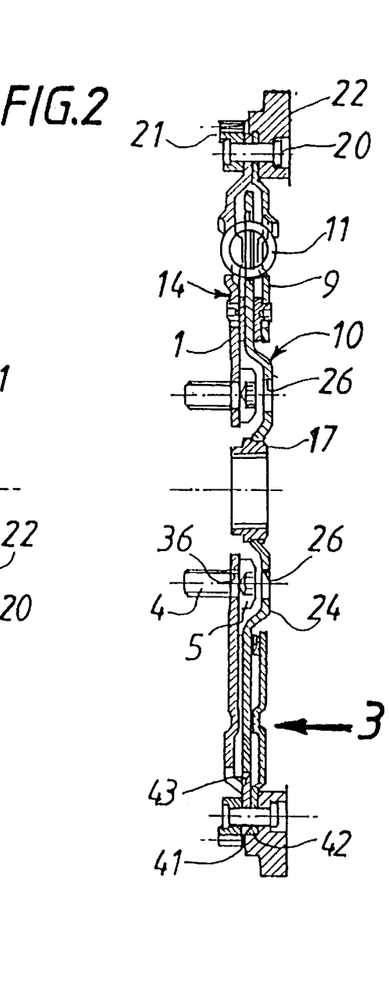
FIG. 2 is a view in section taken along the line 2—2 in FIG. 3 for a second embodiment.
Figure 3:
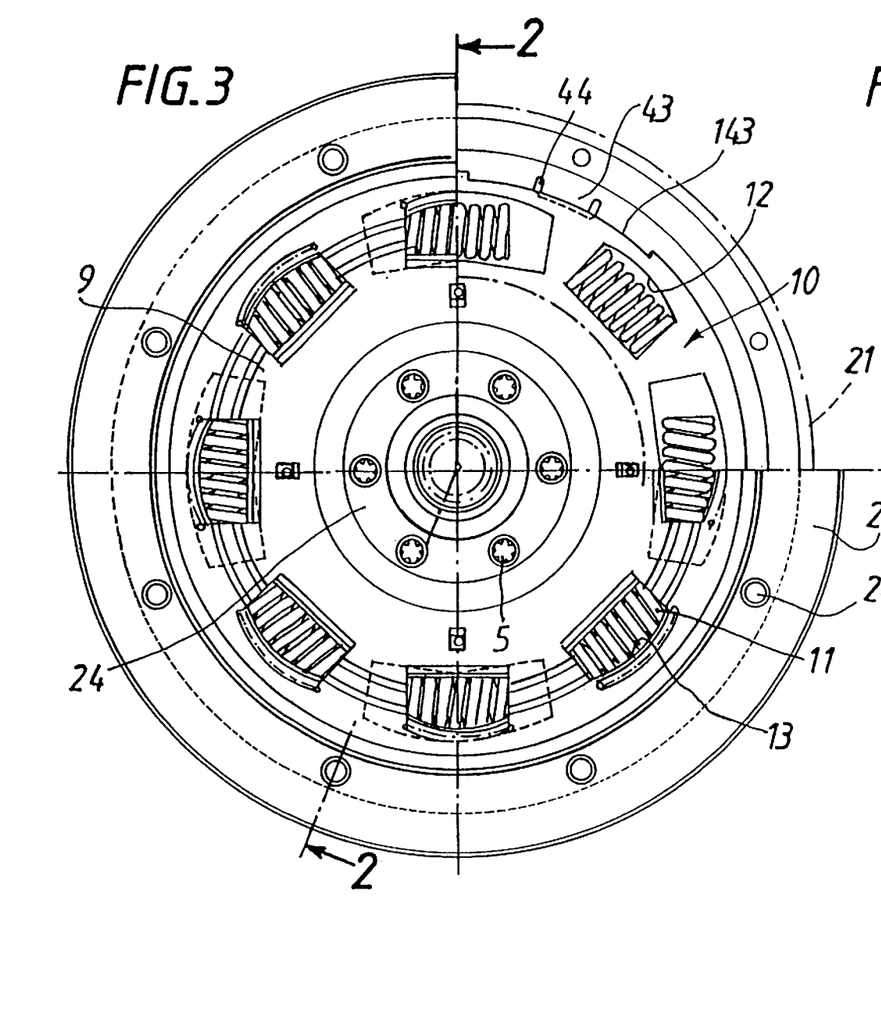
FIG. 3 is a view in the direction of the arrow 3 in FIG. 2, locally cut away and showing the inertia weight and second guide washer.

In FIGS. 2 and 6, as in FIG. 1, the rivets 20 pass through axially aligned openings in the starter ring gear 21 and in the rings 41 and 42 respectively forming part of the first guide washer 1,2 and the second guide washer 9.

The rings 41, 42 of the guide washers are therefore clamped between the parts 21, 22 each of which has a spot facing (no reference number) to accommodate respective opposite ends of the rivets 20.

The rings 41, 42 are offset axially relative to the main part of the associated guide washers 1,2—9 and extend to the outside periphery of said washers.

The ring 41 of the guide washer 1,2 has lugs 43 projecting radially inwards. The lugs are obtained by cutting and bending the first guide washer 1,2, producing a slot 44. The lugs 43 are in the plane of the flange 10 and are adapted to cooperate with the edges of notches, here the notches 143, in the flange 10 at its outside periphery to limit relative angular movement between the flange 10 and the guide washers 1,2—9.

The first guide washer 1,2 shown here is thicker than the second guide washer 9 because its outside periphery carries the second guide washer 9.

In FIGS. 4 and 5 the guide washers 1,3 are the same thickness for manufacturing reasons, because they are identical at their outside periphery, the first guide washer 1 carrying the second guide washer by means of a continuous weld bead (no reference number).

The second fixing means between the two guide washers can therefore consist in a weld or employ fixing members 20 in the form of rivets or bolts (nut and bolt system), or any other means.

In FIGS. 4 and 5 the inertia weight 22 extends radially above the second guide washer 3 to which it is fixed by a weld bead (no reference number).

Similarly the starter ring gear 21 extends radially above the first guide washer 1 to which it is fixed by a weld bead (no reference number).

The coupling device in accordance with the invention comprises four radial stages, namely, from the outside periphery to the inside periphery of the elastic coupling device, a first stage including the rivets 20 or the welds or other fixing means, the ring gear 21 (driven by the starter motor of the vehicle) and the inertia weight 22, a second stage comprising the circumferential action spring means 11, 110, a third stage comprising the friction means 15, 25, 16 and a fourth stage comprising the first fixing means of the first guide washer 1.

This arrangement makes best use of the available space combined with providing the maximum functions and a small axial overall size. This arrangement does not required centering bearings, the guide washers 1,9—2,9, 1-3 extending radially beyond the hub 17.

The way the distribution washers 15 and friction washers 25 are mounted enables the friction means 14 to be suspended from the guide washers 1,9.

In an alternative embodiment at least one of the washer 25, 15 is replaced by a friction washer adhesively bonded to a metal washer including drive lugs engaging in holes in the guide washer concerned.

The flange 10 has at it inside periphery a transversely oriented portion 24 offset axially relative to the main part of the hub 10 between the two guide washers 1,9.

The portion 24 extends radially below the friction means 14.

The inside portion 24 is offset axially towards the second guide washer 3,9, i.e. in the opposite axial direction to the outside portion 23 of the first guide washer 1. This axial offset is made possible by the configuration of the second guide washer 3,9, which is shorter than the first guide washer 1. The second guide washer 3,9 surrounds the inside portion 24 in all cases. The inside portion penetrates into the central opening of the second guide washer 3,9.

To be more precise, the opening in the second guide washer 3,9 (FIGS. 1 through 5 and 8,9) has a diameter greater than that of the opening in the first guide washer 1,2, which projects radially inwards relative to the second guide washer 3,9.

Accordingly the portion 24 of the flange can penetrate into the opening in the second guide washer by being axially offset towards said opening.

This does not increase the axial overall size and the heads 5 of the fixing screws can be disposed axially between the first guide washer 1 and the inside portion 24 of the flange 10. The portion 24 has holes 26 providing access to the screw heads. The diameter of the hole 26 can be greater than that of the head 5 of the screw or less than the diameter of the head 5 of the screw 4, as shown in the figure.

In the latter case the screw 4 is trapped and is fitted before the rivets 10 are inserted.

The first guide washer 1 facilitates assembly of the coupling device in the form of a module. The device is assembled by putting the first guide washer 1 down flat and then stacking the other components axially on the first guide washer 1, the second guide washer completing the assembly.

Of course, the present invention is not limited to the embodiment described.

Accordingly, in FIGS. 6 and 7, the first guide washer 2 is separate from the drive plate 1 fixed by screws 4 to the crankshaft of the engine of the vehicle (not shown), as in FIG. 1, the flange 10 therefore having holes 26 as in the other figures. The drive plate 1 is simplified and is surrounded by the guide washer 2, rotationally coupled to the drive washer by axially elastic tongues 50 and allowing axial displacement of the first guide washer 2 relative to the drive plate.

Thus axial vibrations generated by axial oscillations of the crankshaft can be filtered out.

Two diametrically opposed tongues 50 are provided here. The tongues are in the form of plates and are fixed to the inside periphery of the first guide washer 2 by rivets 150 at their outside periphery.

At its inside periphery each tongue 50 is fixed by two of the holes for the screws 4, for which purpose a hollow rivet 151 is inserted in each hole (no reference number).

Each rivet bears against one face of the plate 1 and is peened on the other face of the plate 1, in contact with the tongue 5, to fix the latter.

The tongues 50 are therefore in contact with the face of the drive plate facing towards the flange 10.

The plate 1 has lugs 160 at its outside periphery to limit axial movement of the tongues 50 before the coupling device is mounted on the crankshaft.

The lugs 160 are obtained by cutting and bending the plate and project axially away from the flange 10. The lugs 160 cooperate with the inside periphery of the guide washer 2, to be more precise with the face thereof facing away from the flange 10.

In practice the lugs 160 are part of a bayonet coupling 161 between the inside periphery of the first guide washer 2 and the outside periphery of the plate 1.

There are passages in the washer 2 and after the lugs 160 have been inserted in these passages the plate is rotated so that the lugs 160 face the lugs 170 of the plate 1.

Accordingly, before it is fixed to the crankshaft, the washer 2 is locked axially between the lugs 160, 170 of the plate 1. In service the lugs 170 limit movement of the tongues.

Figure 8:
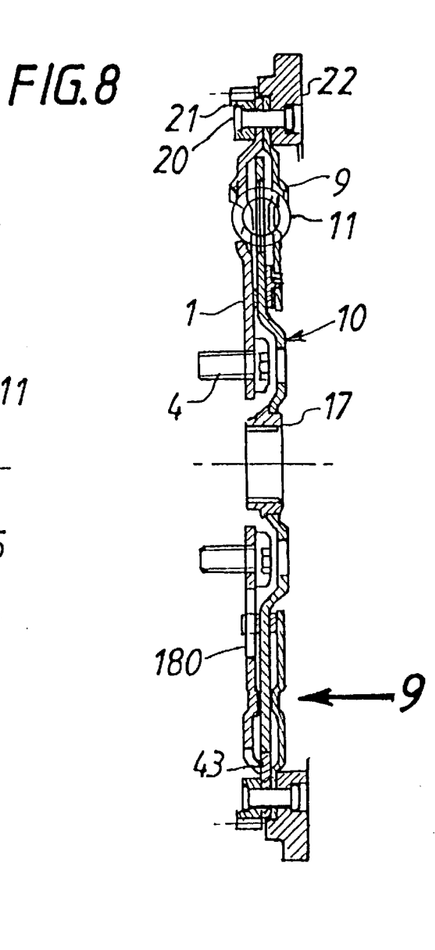
FIGS. 8 and 9 are views similar to FIGS. 2 and 3 with two locally cut away areas in FIG. 9 to show the flange and the first guide washer.
Figure 9:
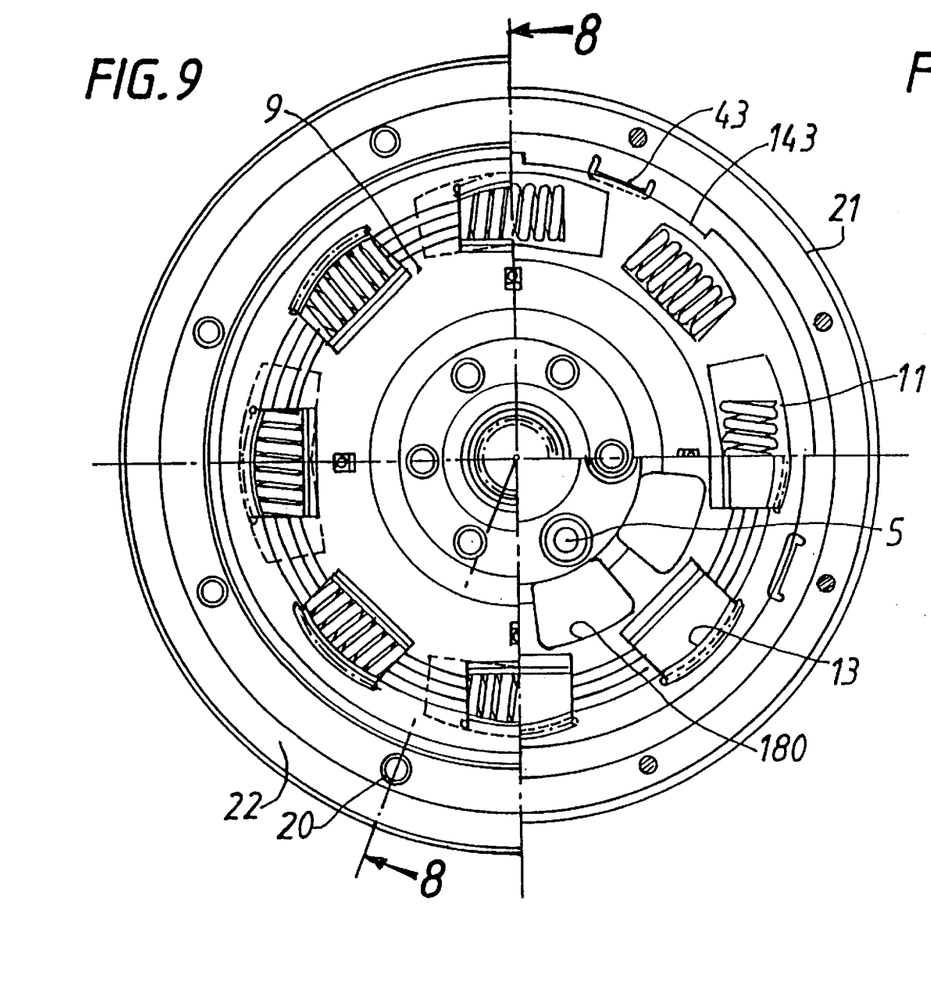

Vibration can of course be filtered by making the first guide washer 1 flexible, as shown in FIGS. 8 and 9.

The first guide washer then has trapezoidal holes below the windows 13. The other reference numbers have the same significations as in FIGS. 2 and 3.

The first guide washer 1 can carry the starter ring gear 21 and for this purpose can have at its outside periphery a ring member directed axially towards the second guide ring 9. The ring gear 21 is then force20 fitted onto the ring member, which can also carry a timing mark.

The timing mark can of course be provided on the inertia weight 22 in FIG. 1, the outside diameter of which is equal to that of the ring gear 21.

In an alternative embodiment the ring gear 21 and the weight 22 are one and the same. The weight 22 may not be needed in some cases.

If so, the first guide washer 1 can carry the ring gear 21 in the aforementioned manner and the rivets 10 can be replaced by spacers of the type described in document FR-A-2 494 795.

In an alternative embodiment the second fixing means include a ring member extending continuously from the periphery of one of the guide washers to the other, as described in document FR-A-2 411 999.

For example, the ring member extends radially above the flange 10, originating from the first guide washer 1, the second washer being fixed to the end of the ring gear, for example crimped or welded to it, as described in document FR-A-2 411 999. The starter ring gear can be force-fitted onto the fixing ring member.

Clearly the module in accordance with the invention can quickly be fastened to the crankshaft, the tool for turning the screws being passed through the holes 26 axially coinciding with the holes 36 in the first guide washer 1.

The rivets 20 can of course be replaced by bolts. The transmission casing can be very close to the coupling device in accordance with the invention, to be precise very close to the line D in FIG. 1.

Note that in FIGS. 6 and 7 the first fixing means include the tongues.

What is claimed is:

1. An elastic coupling device between a driving shaft (100) and a driven shaft (200) that are substantially aligned, including a drive plate (1) for rotational coupling to the driving shaft (100), a hub (17) for rotational coupling to the driven shaft (200) and, between the hub (17) and the drive plate (1), two guide washers (1 through 3,9) disposed on respective opposite sides of a flange (10) with circumferential action spring means (11, 110) operating between the flange (10) and the guide washers (1 though 3-9), characterized in that the drive plate (1) is constrained to rotate with one of the guide washers (1,2), constituting a first guide washer, while the flange (10) is fastened, possibly after taking up circumferential play, to the hub (17) and in that the hub (17) is directed axially towards the first guide washer (1), in that the first guide washer (1,2) carries the other guide washer (2-9), constituting a second guide washer, fixed to an outside periphery of said first guide washer, and in that said device is thicker at the outside periphery than at an inside periphery of said first guide washer, and wherein said first guide washer is rotationally coupled to the drive plate by elastic tongues (50) allowing axial displacement of the first guide washer, and wherein the first guide washer surrounds the drive plate.

2. A device according to claim 1 characterized in that, to form a unitary module, the first guide washer (1) has first fixing means for fixing it to the driving shaft (100) at its inside periphery and second fixing means (20,21,22) for fixing the second washer (9) radially beyond said first means.

3. A device according to claim 2 characterized in that the second fixing means (20 through 22) extend radially beyond the circumferential action spring means (11,110).

4. A device according to claim 3 characterized in that the first guide washer (1,2) carries a starter ring gear (21).

5. A device according to claim 4 characterized in that the second fixing means include a starter ring gear (21) and an inertia weight (22) forming a spacer between the guide washers (1,9) and rivets (20) passing through the guide washers (1,9), the starter ring gear (21) and the inertia weight (22).

6. A device according to claim 5 characterized in that the starter ring gear (21) is in contact with the first guide washer (1) and the inertia weight (22) is in contact with the second guide washer (9) and projects axially outwards relative to the second guide washer (9).

7. A device according to claim 6 characterized in that the starter ring gear (21) is in contact with a portion (23) of the first guide washer (1) at the outside periphery thereof and in that this portion (23) is offset 15 axially outwards relative to the main part of the first guide washer (1).

8. A device according to claim 4 characterized in that the second fixing means consist in a weld bead and in that the first guide washer (1) and the second guide washer (3) have identical shapes at their outside periphery and are welded together face to face at their free edge.

9. A device according to claim 8 characterized in that the spring means (110) are curved springs mounted in a cavity delimited externally by the guide washers (2,3).

10. A device according to claim 9 characterized in that the cavity is closed by sealing washers (40) on respective opposite sides of the flange (10).

11. A device according to claim 4 characterized in that the guide washers (1,2-9) have at their outside periphery rings (41,42) in contact and clamped between the starter ring gear (21) and an inertia weight (22), rivets (20) assembling said ring gear (21) and said weight (22) to the rings (41,42).

12. A device according to claim 11 characterized in that axial action friction means (14) are carried by the guide washers (1 through 3-9) radially below the circumferential action spring means (11,110).

13. A device according to claim 12 characterized in that the opening in the second guide washer (3,9) has a diameter greater than that of the opening in the first guide washer (1).

14. A device according to claim 13 characterized in that the flange (10) has at its inside periphery a portion (24) offset axially towards the opening in the second guide washer (9).

15. A device according to claim 14 characterized in that this portion (24) has holes for access to the heads (5) of screws (4) for fixing the device to the driving shaft disposed between the drive plate (1) and said portion (24).

16. A device according to claim 1 characterized in that the drive plate (1) is in one piece with the first guide washer (1).

17. A device according to claim 16 characterized in that the first guide washer (1) has holes (180) at its inside periphery.

* * * * *